US006092772A

United States Patent [19]

Garcia et al.

[11] Patent Number: 6,092,772

[45] Date of Patent: Jul. 25, 2000

[54] ANCHORED FLOATING DEVICE FOR SUPPORTING A BATH TUB ACCESSORY

[76] Inventors: Daniel Garcia, 17905 SW. Pacific Hwy, Tualatin, Oreg. 97062; Scott Brunton, 320 SE. 63rd, Portland, Oreg. 97215; Gregory T. Kavounas, 9920 SW. Conestoga Dr., #199, Beaverton, Oreg. 97008

[21] Appl. No.: 09/261,921

[22] Filed: Mar. 3, 1999

Related U.S. Application Data

[60] Provisional application No. 60/094,516, Jul. 29, 1998.

[51] Int. Cl.7 .......................... A45D 42/14; F16B 47/00; B25G 3/00; F16D 1/00

[52] U.S. Cl. .................................... 248/205.5; 248/309.3; 403/331

[58] Field of Search ............................. 248/205.5, 205.1, 248/309.3; 403/331; 4/559

[56] References Cited

U.S. PATENT DOCUMENTS

| | | | |
|---|---|---|---|
| D. 313,660 | 1/1991 | Adams . | |
| 1,167,155 | 5/1916 | Derby | 403/331 |
| 3,556,704 | 1/1971 | Grasznick . | |
| 4,224,017 | 9/1980 | Kayne . | |
| 4,260,365 | 4/1981 | Kayne . | |
| 4,566,055 | 1/1986 | Klees et al. . | |
| 4,839,784 | 6/1989 | Lin . | |
| 4,937,701 | 6/1990 | Schroder . | |
| 5,028,026 | 7/1991 | Philipps et al. | 248/205.5 |
| 5,101,328 | 3/1992 | Hai . | |
| 5,244,300 | 9/1993 | Perreira et al. | 403/331 |
| 5,361,195 | 11/1994 | Chen . | |
| 5,419,527 | 5/1995 | Adams et al. . | |
| 5,422,803 | 6/1995 | Kilgore . | |
| 5,524,394 | 6/1996 | Szabo, Sr. et al. | 403/331 |
| 5,573,214 | 11/1996 | Jones et al. | 248/205.5 |
| 5,578,089 | 11/1996 | Elsamaloty . | |
| 5,601,272 | 2/1997 | Adams et al. . | |
| 5,621,927 | 4/1997 | Reiss et al. | 4/559 |
| 5,645,254 | 7/1997 | Ng et al. | 248/205.5 |
| 5,651,209 | 7/1997 | Rainey . | |
| 5,894,611 | 9/1998 | Toro | 4/559 |

*Primary Examiner*—Ramon O. Ramirez
*Assistant Examiner*—Jerome A. DeLuca
*Attorney, Agent, or Firm*—Marger, Johnson & McCollom, PC

[57] ABSTRACT

A device is provided for supporting an accessory in an artificial bathing water enclosure. The device includes a buoyant base for supporting the accessory. An anchoring means anchors the base to a side wall of the bathing water enclosure. The base either floats freely, or is pulled down somewhat while still protruding from the top water surface. The preferred anchoring means includes one or more suction cups attached to the side walls of the enclosure. The preferred anchoring means maintains the base upright. It includes a boss and a holder that are slidable with respect to each other. At least two suction cups hold the boss attached to the side wall, while the holder is attached to the base, and slides up and down as the base moves up and down. The holder has threads for receiving matingly threads of a complementary base.

20 Claims, 4 Drawing Sheets

ANCHORED FLOATING DEVICE FOR SUPPORTING A BATH TUB ACCESSORY

CROSS REFERENCE TO RELATED APPLICATIONS

This application claims the benefit of U.S.A. Provisional Application Ser. No. 60/094,516, filed on Jul. 29, 1998.

BACKGROUND OF THE INVENTION

1. Field of the Invention

The present invention is generally related to the field of accessories for bath tubs, spas and swimming pools, and more specifically to a floating device for supporting such accessories that is anchored to a side wall of the bath tub, spa or swimming pool, and floating nearby.

2. Description of the Related Art

Bathers in artificial bathing water enclosures (such as bath tubs, spas, swimming pools and the like) use a number of accessories. Such accessories include but are not limited to soap bars, candles, bubble bath, bath oil beads, aromatic substances such as burning candles, radios, etc.

Presently such accessories are placed either peripherally to the water enclosure, or on the water itself, either on floating structures or to float by themselves. Neither solution is perfectly satisfactory for some of them.

When the accessory floats on the water surface, the bather needs to monitor it constantly, which is distracting. If not, the accessory might drift too far away to be useful. For example, a radio floating on a swimming pool might drift to a point where it is no longer heard well. Or, the accessory may drift to a close location where the bather may accidentally bump it. This would be a problem if the accessory is a burning candle. And it would be a big problem if the burning candle set a hanging curtain on fire.

When the accessory is placed on the rim of the artificial bathing water enclosure, it might not be close enough to the bather. For example, a candle placed on the rim might illuminate unsightly surroundings, such as a wall, a sink, a toilet, etc. Worse, the slightest air current carries away the aroma, thus detracting from the bather's olfactory ambiance.

For these reasons it is desirable to have candles close to the bather, where they contribute more to stress relief and even add a romantic ambiance. A problem with that is that the level of the water surface changes with time. It changes slowly as a bath tub is draining, and quickly when bathers get in and out of it. As such, it is desirable to make the candle float, because that would follow automatically the changing level of the water surface.

Efforts to make candles float mostly address the concern of preventing the candle from tipping over. U.S. Pat. No. 5,101,328 teaches to add a weight 41 at the bottom, so as to lower the center of gravity. U.S. Pat. No. 4,524,408 teaches to support a candle with a hollow annular air-filled structure 43, also known as floater, spaced at a relatively large radius from the candle stem. However, none of these references deal with the problem of the candle drifting away from its original location.

BRIEF SUMMARY OF THE INVENTION

The present invention overcomes these problems and limitations of the prior art.

Generally, the present invention provides a device for supporting an accessory in an artificial bathing water enclosure. The device includes a buoyant base for supporting the accessory. The device also includes anchoring means for anchoring the base to a side wall of the bathing water enclosure. The base either floats freely, or is pulled down somewhat while still protruding from the surface. Either way, the accessory does not drift away, and stays close to the bather without needing to be monitored. The preferred anchoring means includes one or more suction cups, which can be applied to most types of such walls without needing to adapt them.

In addition, the preferred anchoring means of the present invention is adapted to maintain the base upright, which prevents a supported candle from being inverted. The preferred anchoring means includes a boss and a holder that are slidable with respect to each other. At least two suction cups hold the boss attached to the side wall, while the holder is attached to the base. The holder thus slides up and down as the base moves up and down, thereby following the changing level of the water surface.

The preferred embodiment of the invention further holds the candle such that the flame is maintained burning lower than the water surface. As a result, the light energy illuminates the volume of water itself, instead of the unsightly surroundings. The bather's attention is thus drawn away from the surroundings, and into the luminous water. The flicker of the flame gives the water an appearance of an internal wave like motion, which mesmerizes the bather into a sensation of bathing in light.

The foregoing and other objects, features and advantages of the invention will become more readily apparent from the following detailed description of a preferred embodiment, which proceeds with reference to the drawings.

DETAILED DESCRIPTION OF THE PREFERRED EMBODIMENT(S)

The present invention is intended for use in artificial bathing water enclosures. For purposes of this document, the term artificial bathing water enclosure means bath tubs, spas, swimming pools and the like made artificially by human beings for bathing. The term does not include naturally occurring bodies of water such as lakes, or water enclosures created not primarily for bathing.

Figure 1:
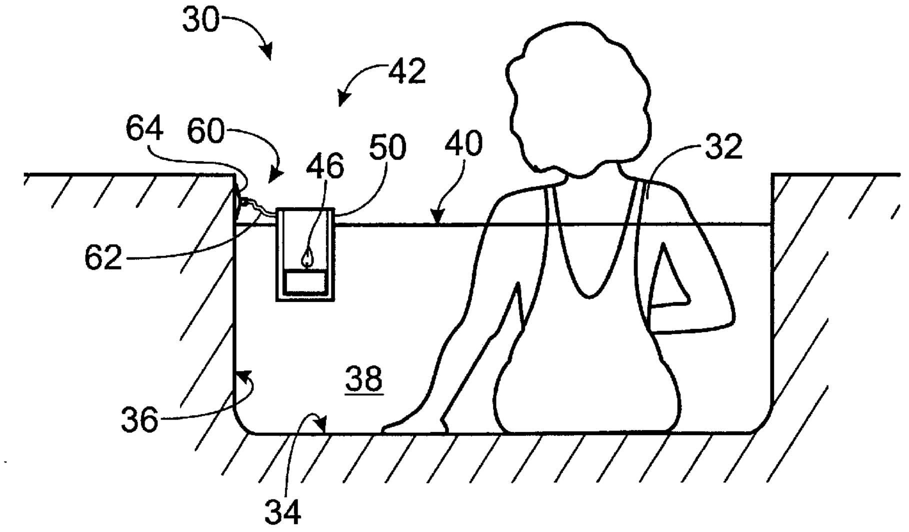
FIG. 1 is a diagram showing a first embodiment of the invention.

A bath tub 30 is seen in FIG. 1, with a bather 32. The bath tub is defined by a bottom wall 34 and side walls 36. The bath tub contains water 38 that may contain bath oils and the like. The water defines a top surface 40. As has been mentioned, the invention provides a device 42 for supporting on the top water surface an accessory 44.

In the following description a generic candle 44 is used as an example only of the accessory. Candle 44 has a flame 46. The present description renders apparent to a person skilled in the art how the invention can be practiced for any accessory.

Device 42 of the invention generally includes a base 50 for supporting the accessory. In general, the nature of the accessory drives the design of the base. The base is made preferably buoyant, so that it tends to float towards the top water surface, and float freely on it if permitted. In either case, the base is always at least partly immersed in the water. The preferred base for supporting a candle is described later in this document.

The device of the invention further includes anchoring means 60 that couples the base to the side wall. It does this by being coupled to the base and also coupled to the wall. The anchoring means is now described in detail, and independently of bases.

Anchoring Means

The anchoring means of the invention can be made from an elongate member 62. Member 62 can also be flexible, such as tethering. Tethering can be accomplished by any suitable means such as a chain, a twine segment or a ribbon.

The anchoring means is attached to base 50. Further, it includes a suitable wall attachment means 64 that is attached to the side wall. The wall attachment means preferably relies on suction principles for adhering to the side wall of the enclosure. The ambient humidity does not affect adversely the effectiveness of suction—it even enhances it. Moreover, suction works well because the walls of artificial bathing water enclosures are made nonporous in the first place, so as to contain the water.

The preferred wall attachment means is one or more suction devices, such as suction cups. Suction cups are preferred because they are very economical, their use does not require instructions, and the side walls of the water enclosure do not need to be adapted for it.

The side walls are chosen for anchoring the device of the invention, because they meaningfully prevent the accessory from drifting away laterally on the surface of the water. Anchoring from the bottom wall is possible, but not as effective.

As seen in FIG. 1, member 62 is attached to a top portion of base 50, which floats freely. Alternately, it could be attached to a bottom portion, which is advantageous for two reasons.

The first reason is that typically a container-like base such as base 50 of FIG. 1 tends to be very buoyant by itself. By this it is meant that, if permitted, it would rise to an equilibrium point at the top water surface where it would then float freely. As also described elsewhere in the document, it is desirable to have flame 46 below the top water surface 40. This is accomplished by using the anchoring means to pull the buoyant base down somewhat from the equilibrium point. Accordingly, suction cup 64 is placed lower than shown, and member 62 is attached to a bottom portion of the base. Pulling it down prevents free floating.

The second reason to attach member 62 to a bottom portion of the base is as a safety precaution. Indeed, if in such a case the water level became too low, member 62 would cause the base to tip over on purpose, so as to extinguish the flame of the candle. While these considerations have been described in connection with the embodiment of FIG. 1, a person with skill in the art will discern how they apply to the other embodiments of the invention.

Figure 2:
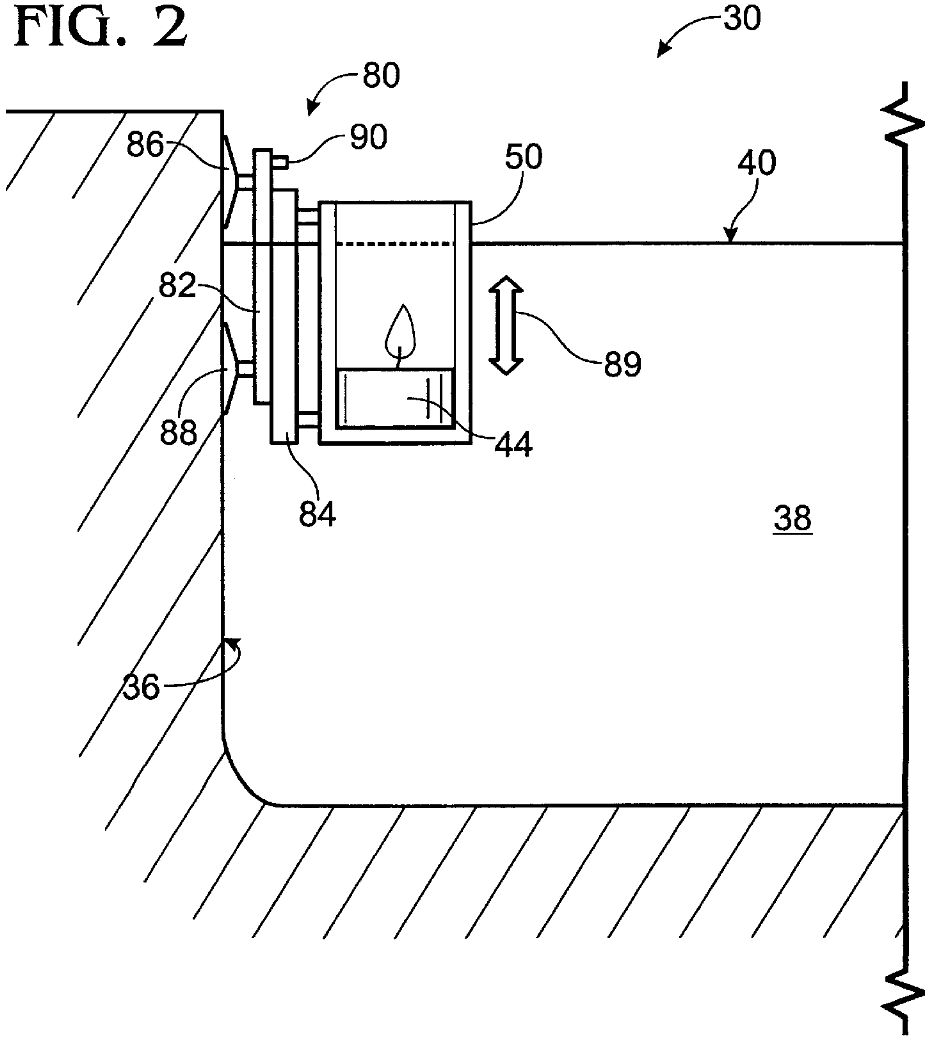
FIG. 2 is a diagram showing a second embodiment of the invention.

Referring to FIG. 2, a more preferred anchoring means 80 of the invention is described in detail. Specifically, a base 50 floats freely on top water surface 40 of water 38 in a bath tub 30. The anchoring means includes a boss 82 and a holder 84. The boss is coupled with the side wall by suction cups 86, 88. The holder is coupled with base 50.

The boss and the holder are engaged movably with each other. This way the holder can move, even if the boss can not. It is preferred that the boss and the holder are engaged slidably with respect to each other, in which case the holder can move freely in one dimension. This dimension is advantageously set up to be the vertical direction. As such, the holder follows the level of base 50, which floats freely and follows the changing level of top water surface 40 according to arrow 89.

Since the dimension of the vertical movement is the vertical direction, the holder follows up and down without displacing the base laterally. This causes it to be a friction free movement, which is one reason why vertical alignment is preferred. The other reason is for when the accessory is a burning candle. Lateral movement, if permitted, allows the liquid wax to shift back and forth, potentially extinguishing the flame.

In FIG. 2, tub 30 is shown with less water 38 than it could have. In other words, top water surface 40 is lower than it could be. It might have been higher at a prior time, and draining since then. It could become higher if more water were added, or if bathers entered the tub.

If surface 40 is raised, base 50 will be raised up to a point. Holder 84 will follow up to a point. Holder 84 will concomitantly slide up boss 82 up to a point.

The device of the invention further includes a stop 90 that prevents further rise of the holder, and thus also further rise of the base. Accordingly, if the top water surface is raised somewhat past that point, the holder will not follow, and will prevent the base from following. This will have the desirable result that the flame will be deeper beneath the top water surface, and thus more of its light will go into the water instead of the space above. (But if the top water surface is raised too much past the point defined by stop 90, then water will overflow into the container-like base.)

One way to implement the slidability feature is now explained in detail with reference to FIG. 3. Boss 82 includes an elongate trough 92, and holder 84 includes an elongate projection 94 received in the trough, and slidable along the trough. Equivalently, the boss 82 can include the projection, and the holder can include the trough.

It is preferred that sliding in the downward direction is unimpeded for the entire length of the trough. This means that if the water level becomes too low, projection 94 would actually fall out of the trough. (Such can be visualized also with reference to FIG. 2.) This is preferred, so as to address product liability concerns. Indeed, this type of anchoring means makes it impossible to mount the preferred embodiment of the device of the invention on a wall by the suction cups with the candle in mid air. Indeed, if such mounting were permitted, the suction cups could become disengaged from the wall, in which case the burning candle could fall off and cause injury.

Figure 3:
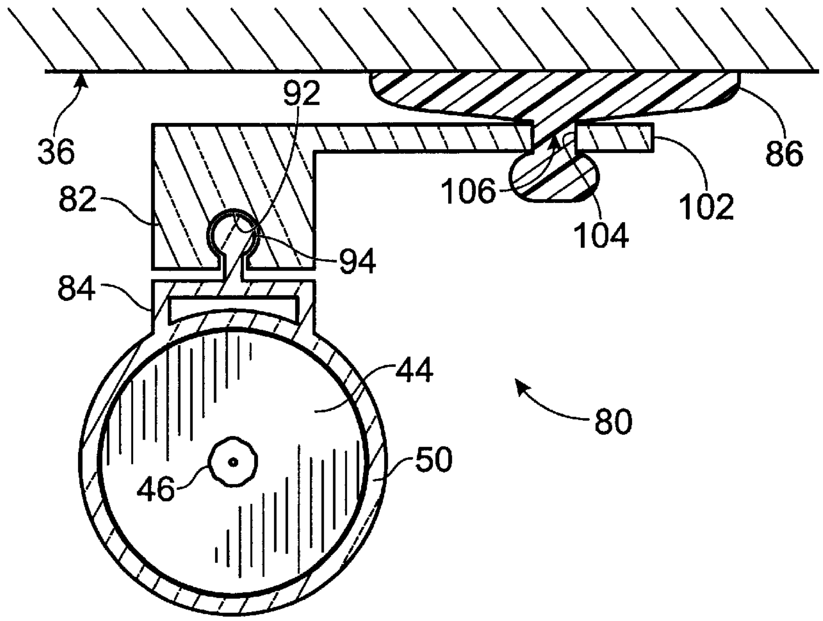
FIG. 3 is a sectional view of the device of FIG. 2.

Stop 90 (described with reference to FIG. 2) is not shown in FIG. 3 for clarity. The stop is positioned relative to the projection and to the trough such that the holder can not slide up the boss past some point. The stop can be implemented in various other ways, such as a discontinuity in the trough.

Returning to FIG. 3, boss 82 preferably also includes a flap 102 that has an opening 104 suitable for receiving therethrough a neck 106 of suction cup 86. The neck is the portion between the head of the suction cup and the portion that contacts the side wall. The flap is located as shown so as to allow easy installation. All one has to do is to press the flap against side wall 36, which causes suction cups 86 and 88 (which is not seen in FIG. 3, because it is behind 86) to stick onto the side wall. The flap also makes removal easier.

Figure 4:
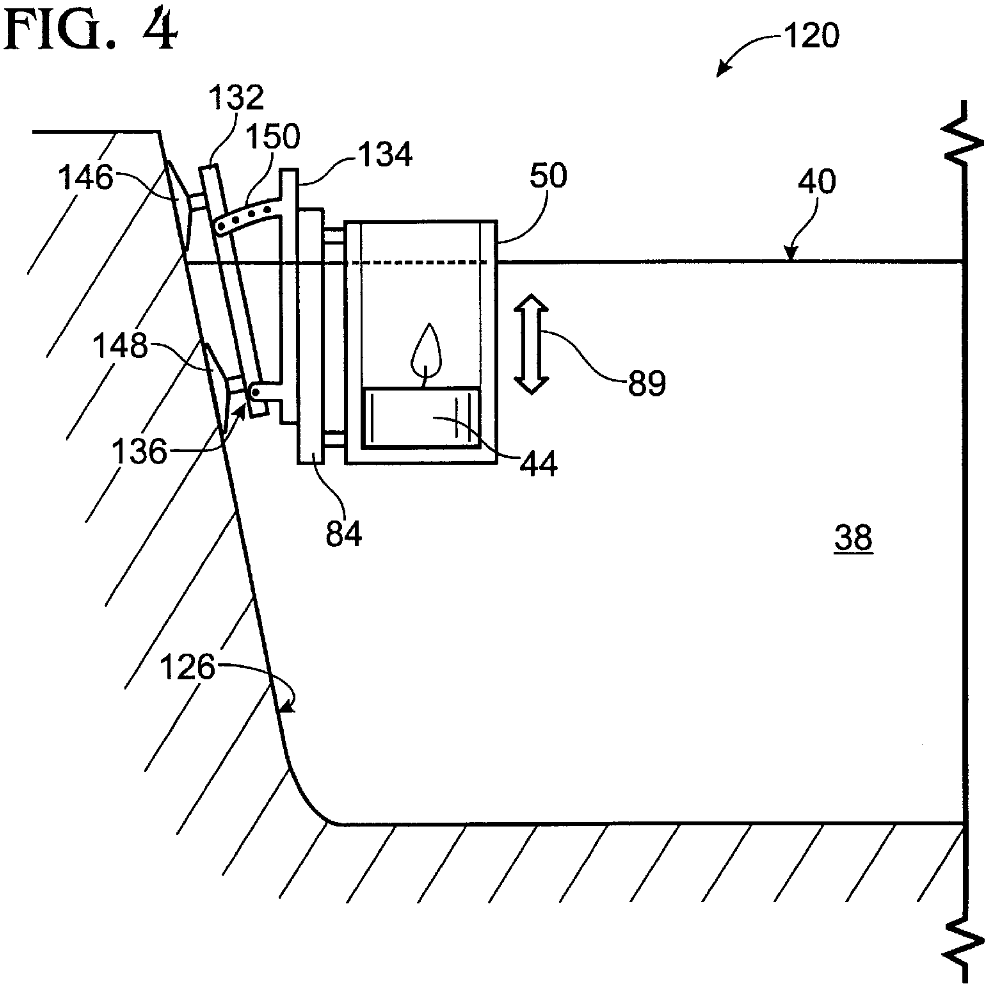
FIG. 4 is a diagram showing a third embodiment of the invention, suitable for a bath tub with inclined side walls.

The side walls of bath tubs are not always vertical. Referring to FIG. 4, bath tub 120 has an inclined side wall 126. In a preferred embodiment of the invention, the boss is made of two components 132, 134, that are rotatable with respect to each other around joint 136. First component 132 is affixed to the side wall using suction cups 146, 148, in a similar way as described above with reference to FIG. 3. Then second component 134, which is coupled with the holder, is aligned with the vertical.

The invention preferably includes means for securing the first and second components in a fixed angular relationship with respect to each other. The securing means can be for component 132 to have a small projection, and for component 134 to have an extension 150, with holes at various positions that can receive the projection. The extension can be temporarily bent, so that the projection comes out of one hole and is then aligned with a different hole. Thus each hole creates a different angular setting for component 134.

Figure 5:
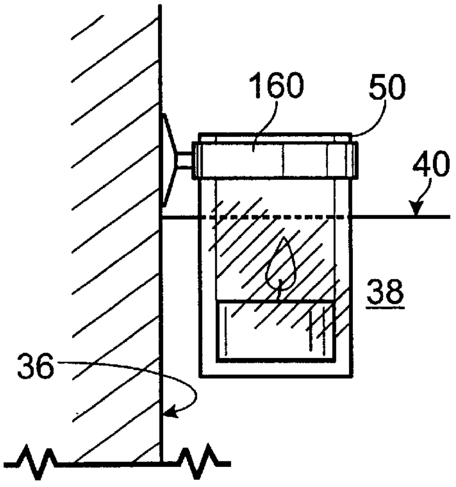
FIGS. 5 and 6 are showing embodiments where a holder of the invention surrounds a base of the invention.
Figure 6:
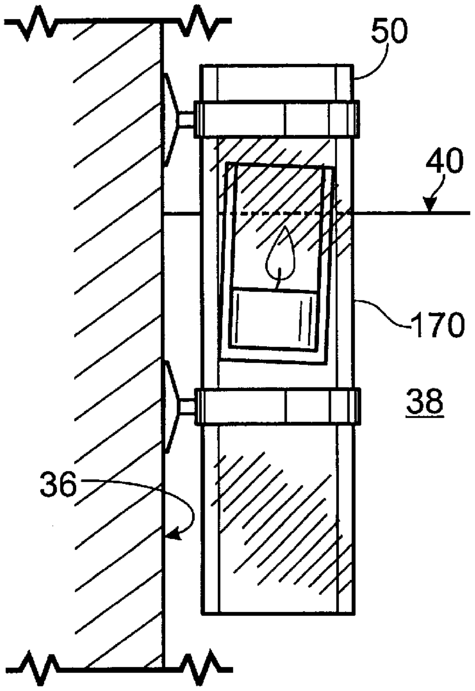

Another way to implement the slidability feature is now explained in detail with reference to FIGS. 5 and 6. In both cases base 50 floats on top water surface 40, and the anchoring means simply surrounds the base. In FIG. 5, the anchoring means is a ring 160 10 that permits the base to move only up and down. In FIG. 6, the anchoring means is an extended transparent tube 170, which permits the candle to travel and remain aligned over a longer range, but it isolates it more from the bather. In both cases the anchoring means can be attached to side wall 36 with structures as required, such as the structures described above.

Slidability within the anchoring means is not the only way to permit the base to follow the changing level of the water surface. Two alternate embodiments are now described with reference to FIGS. 7 and 8. As will be appreciated, however, these embodiments are not preferred, because changing of the vertical level also results in lateral displacement of the candle. These embodiments can address some of the potential product liability concerns, if they are modified from what is shown so that the anchoring means is attached to a lower portion of the base.

Figure 7:
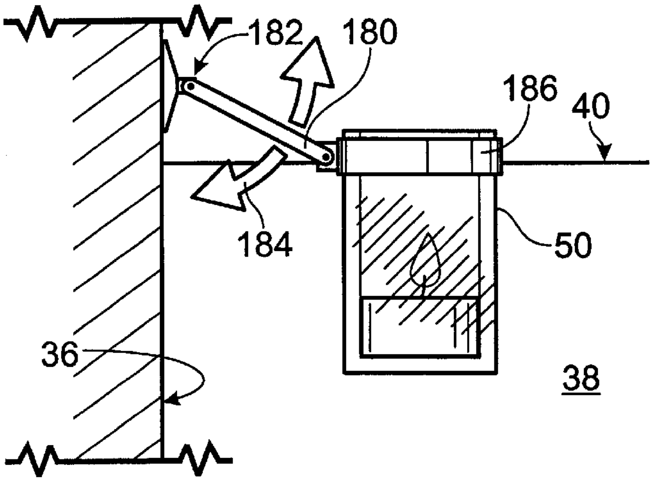
FIGS. 7 and 8 are diagrams showing embodiments where an anchoring means of the invention includes an elongate arm and rotates around an end of the arm.

In FIG. 7, the anchoring means includes an elongate arm 180 having two ends opposite each other. Of these, end 182 is coupled to the side wall. The arm can move with respect to the side wall according to the direction of arrow 184. With this embodiment it is difficult to maintain the base upright. That is why it is preferred to include a floater 186 around it for stability.

Figure 8:
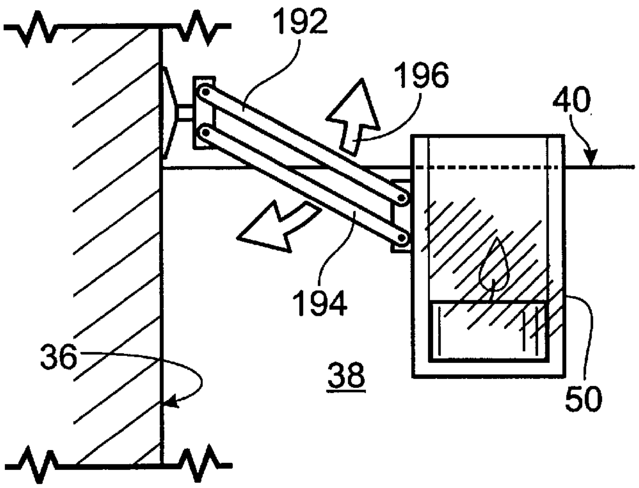

In FIG. 8 the anchoring means includes two elongate arms 192, 194, that move in parallel with each other according to the direction of arrow 196. The base remains upright, and a floater is not needed.

In both embodiments, additional structure or configuration at the joints of the arms can prevent the holder from floating past some point. In the embodiment of FIG. 8, this can be accomplished, for example by having the arms run into each other and lock.

Preferred Holder Base for Supporting a Candle

Figure 9:
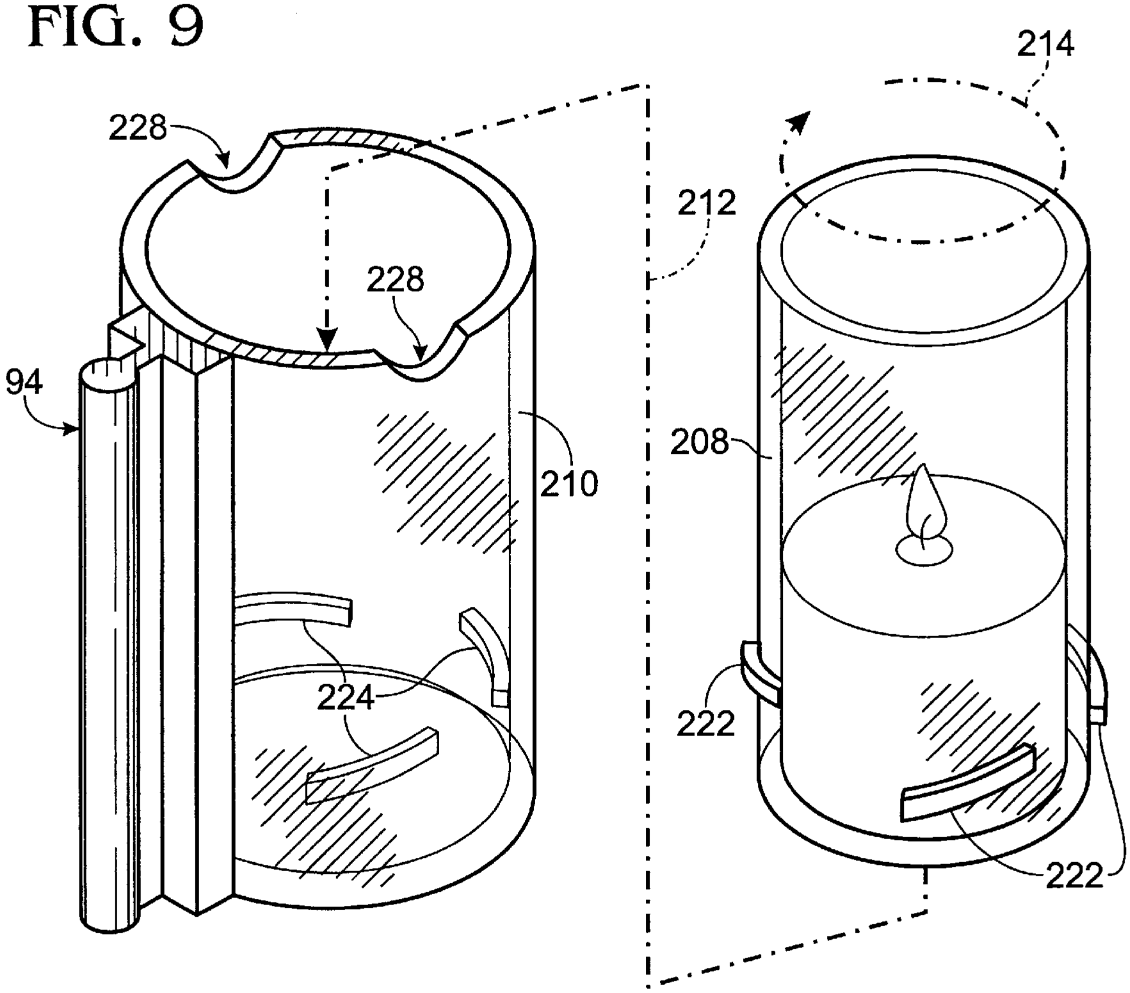
FIG. 9 is a perspective view of a holder made according to the preferred embodiment of the invention and showing how it receives a complementary base made according to the invention.
Figure 11:
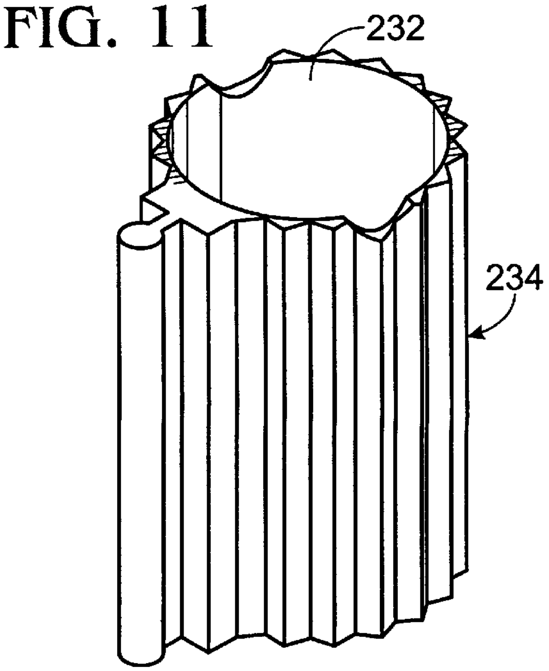
FIG. 11 shows patterns in a translucent surface of the holder of FIG. 9
Figure 10:
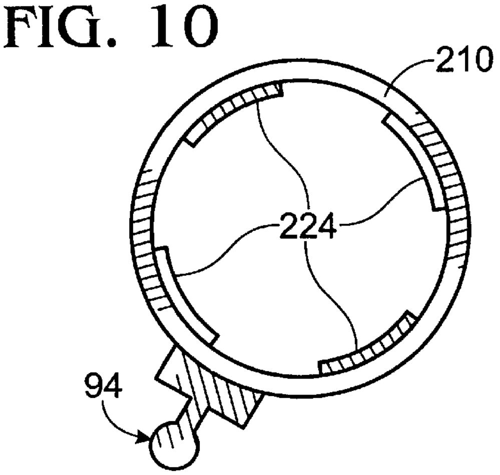
FIG. 10 is a top view of the holder of FIG. 9.

Referring to FIG. 9, preferred base 208 is insertable in the complementary holder 210 according to arrow 212, and then screwed into it according to the direction of arc 214. This way a first set of threads 222 are received matingly by a second set of threads 224. The two cylindrical units thus become parallel, concentric, and not contacting. The insulating plastic of the holder is thus not melted by the hot glass of the base, while also protecting the bather from being burned during accidental contact. The holder has substantially the same height as the base. It also has two cutouts 228 that permit screwing while not exposing the hot base too much.

The base is designed with the following considerations in mind. It is desirable to have the flame be located as deep as possible beneath the top water surface. This way upwardly directed light rays are returned to the water by total internal reflection from the underside of the top water surface. To achieve this effect, the holder is made rather tall, and the candle is made rather short. To provide a long burning time, the candle is made with a lot of wax. Since it is short, the candle is made wide, which renders the holder concomitantly wide.

The wax of the candle is preferably made from translucent, or even transparent material if available. When so made, the downward directed light from the flame goes through the candle, which imparts even more of the available light energy in the volume of water, making it look brighter as a whole. Candles made from transparent gel are preferred, because they burn slowly, which results in a long burning time.

In that case, the bottom surface of the base is additionally made concave or convex, in order to form a lens in the under side. This way, downward directed light is distributed sideways more. In choosing between concave and convex, what is best optically may not be what is optimum from packaging considerations.

It is apparent that the base and the holder are to be considered together, for their optical effects. Each has a vertical surface through which the light moves into the water. As such, these surfaces are at least translucent, and optionally also transparent. More optical effects can be accomplished if the surface thickness varies. As seen in FIG. 9, a holder 232 has a surface 234 whose thickness varies periodically in a circumferential direction. A Fresnel lens can be implemented there.

The holder is also preferably colored. Its color becomes the general color of the water that is illuminated directly. Preferably the same color is chosen as with the candle. The best ambiance is with red or pink colors.

The volume of water appears more luminous in a white bath tub, because the white walls reflect more light energy back into it. Alternately, a more subdued ambience effect is attained when the walls are dark.

The flicker of the flame is associated with concurrent motion of the flame with respect to the base. This changing of the position of the light source with respect to the base makes the wavy light patterns move around, making the whole body of water look like it is moving internally.

A person skilled in the art will be able to practice the present invention in view of the present description, where numerous details have been set forth in order to provide a more thorough understanding of the invention. In other instances, well-known features have not been described in detail in order not to obscure unnecessarily the invention.

Having illustrated and described the principles of the invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. For use with an artificial bathing water enclosure having a side wall and containing water that contacts the side wall, a device for supporting an accessory near where a surface of the water contacts the side wall comprising:

a buoyant base for placing on the water surface to support the accessory thereon; and anchoring means for coupling the base with the side wall, the anchoring means thereby permitting the base to float on the surface while confining a lateral movement of the base along the surface.

2. The device of claim 1, wherein the anchoring means includes a suction cup for attaching to the side wall.

3. The device of claim 1, wherein if a level of the surface of the water is being lowered, the anchoring means is for coupling such that it permits the base to float continuously on the lowering surface.

4. The device of claim 3, wherein the accessory is a candle having a flame at a top portion thereof, and wherein the base and the candle are configured for maintaining the flame at a level lower than a level of the surface.

5. The device of claim 3, wherein the anchoring means includes a boss and a holder engaged movably with each other, the boss is for coupling with the side wall, the holder is for coupling with the base.

6. The device of claim 5, wherein the anchoring means includes a suction cup attached to the boss, the suction cup for attaching to the side wall.

7. The device of claim 6, wherein the boss includes a flap having an opening, the opening for receiving therethrough a neck of the suction cup.

8. The device of claim 5, wherein the boss includes two components that are rotatable with respect to each other around at least one joint, and wherein the first component is for coupling with the side wall and the second component is coupled with the holder.

9. The device of claim 8, further comprising means for securing the second component in a fixed angular relationship with respect to the first component.

10. The device of claim 5, wherein the boss is engaged with the holder for permitting the base to float freely at the surface.

11. The device of claim 10, wherein the accessory is a candle having a flame at a top portion thereof, and wherein the base and the candle are configured for maintaining the flame at a level lower than a level of the surface.

12. The device of claim 5, wherein the base is for being biased by buoyancy towards a top surface of the water, and wherein the boss is engaged with the holder for not permitting the base to float freely at the surface.

13. The device of claim 12, wherein the accessory is a candle having a flame at a top portion thereof, and wherein the boss is engaged with the holder to maintain the flame at a level lower than a level of the surface.

14. The device of claim 5, wherein one of the boss and the holder includes an elongate trough, and the other one of the boss and the holder includes an elongate projection for being received in the trough and for being slidable along the trough.

15. The device of claim 14, wherein the base is for being biased by buoyancy towards a top surface of the water, the trough and the projection are for being oriented vertically, and wherein the anchoring means further includes a stop positioned relative to the projection and the trough for not permitting the base to float freely on the surface.

16. The device of claim 5, wherein the holder of the anchoring means surrounds the base.

17. The device of claim 16, wherein the base is a cylindrical container having a first set of threads, and wherein the holder has a second set of threads for receiving matingly the first set of threads.

18. The device of claim 16, wherein at least one of the base and the holder of the anchoring means includes a surface that has a thickness which varies periodically in at least one direction.

19. For use with an artificial bathing water enclosure having a side wall and containing water that contacts the side wall, a device for supporting a candle having a flame at a top portion thereof near where a surface of the water contacts the side wall, the device comprising:

a base for at least partly immersing in the water to support the candle thereon, the base being buoyed towards the surface, the base being configured for maintaining the flame at a level lower than a level of the surface;

a holder for coupling with the base; and a boss for coupling with the side wall and for engaging movably with the holder for limiting a lateral movement of the base along the surface.

20. For use with an artificial water enclosure having a side wall and containing water that contacts the side wall, a device for supporting a candle capable of having a flame at a top portion thereof near where a surface of the water contacts the side wall, the device comprising:

a buoyant base for floating on the water to support the candle thereon, the base being configured for maintaining the flame lower than the surface;

a holder for coupling with the base such that the base is permitted to float at the surface; and a boss for coupling with the side wall and for engaging slidably with the holder for permitting a vertical movement of the base, wherein one of the boss and the holder includes an elongate trough, and the other one of the boss and the holder includes an elongate projection for being received in the trough and for being slidable along the trough.

* * * * *